United States Patent [19]
in 't Veld

[11] 3,979,291
[45] Sept. 7, 1976

[54] OIL BOOM AND METHOD OF SKIMMING FLOATING OIL FROM THE SURFACE OF A BODY OF WATER

[75] Inventor: Cornelis in 't Veld, Vlaardingen, Netherlands

[73] Assignee: National Marine Service, Inc., St. Louis, Mo.

[22] Filed: May 30, 1975

[21] Appl. No.: 582,271

Related U.S. Application Data

[63] Continuation of Ser. No. 422,603, Dec. 6, 1973, abandoned.

[30] Foreign Application Priority Data

Dec. 7, 1972   Netherlands....................... 7216633

[52] U.S. Cl............................ 210/84; 210/DIG. 25; 210/242 S
[51] Int. Cl.²......................................... E02B 15/04
[58] Field of Search ........ 210/83, 84, 242, DIG. 21; 61/1 F

[56] References Cited
UNITED STATES PATENTS

| | | | |
|---|---|---|---|
| 2,876,903 | 3/1959 | Lee.................................... | 210/242 |
| 3,597,924 | 8/1971 | Risin.................................. | 61/1 F |
| 3,611,728 | 10/1971 | van't Hof........................... | 61/1 F |
| 3,686,870 | 8/1972 | Blomberg........................ | 210/DIG. 21 |
| 3,688,506 | 9/1972 | Marcocchio...................... | 210/242 |
| 3,708,070 | 1/1973 | Bell.................................... | 210/242 |
| 3,731,491 | 5/1973 | Markel et al........................ | 61/1 F |
| 3,734,294 | 5/1973 | Zerbe............................ | 210/DIG. 21 |
| 3,771,662 | 11/1973 | Muramatsu.................. | 210/DIG. 21 |
| 3,775,982 | 12/1973 | Lamboley............................ | 61/1 F |
| 3,786,637 | 1/1974 | Muramatsu........................... | 61/1 F |

*Primary Examiner*—Theodore A. Granger
*Attorney, Agent, or Firm*—Bacon & Thomas

[57] ABSTRACT

An oil boom assembly for collecting lighter liquid from the surface of a body of water includes a plurality of elongated, parallel rows of vertical, buoyant, barrier screen members connected together by flexible means and rigidly braced to hold the rows in parallel relationship in upright position when afloat in water. The rows are of progressively longer length and define open channels therebetween for the flow of liquid. A floating liquid diverter means at one end of the boom diverts relatively moving liquid into the channels to cause transport currents to flow therein towards the opposite ends of the channels, where a liquid skimmer means is provided to remove surface water and lighter fluid floating thereon. The progressive barrier lengths permit flow of surface water around the ends of the shorter barriers into the channels between the barriers and may be arranged to cause the diverting of flow around the ends of the shorter barriers into the channels therebetween and towards the skimmer means. A method for collecting lighter liquid using the above apparatus is also disclosed.

13 Claims, 10 Drawing Figures

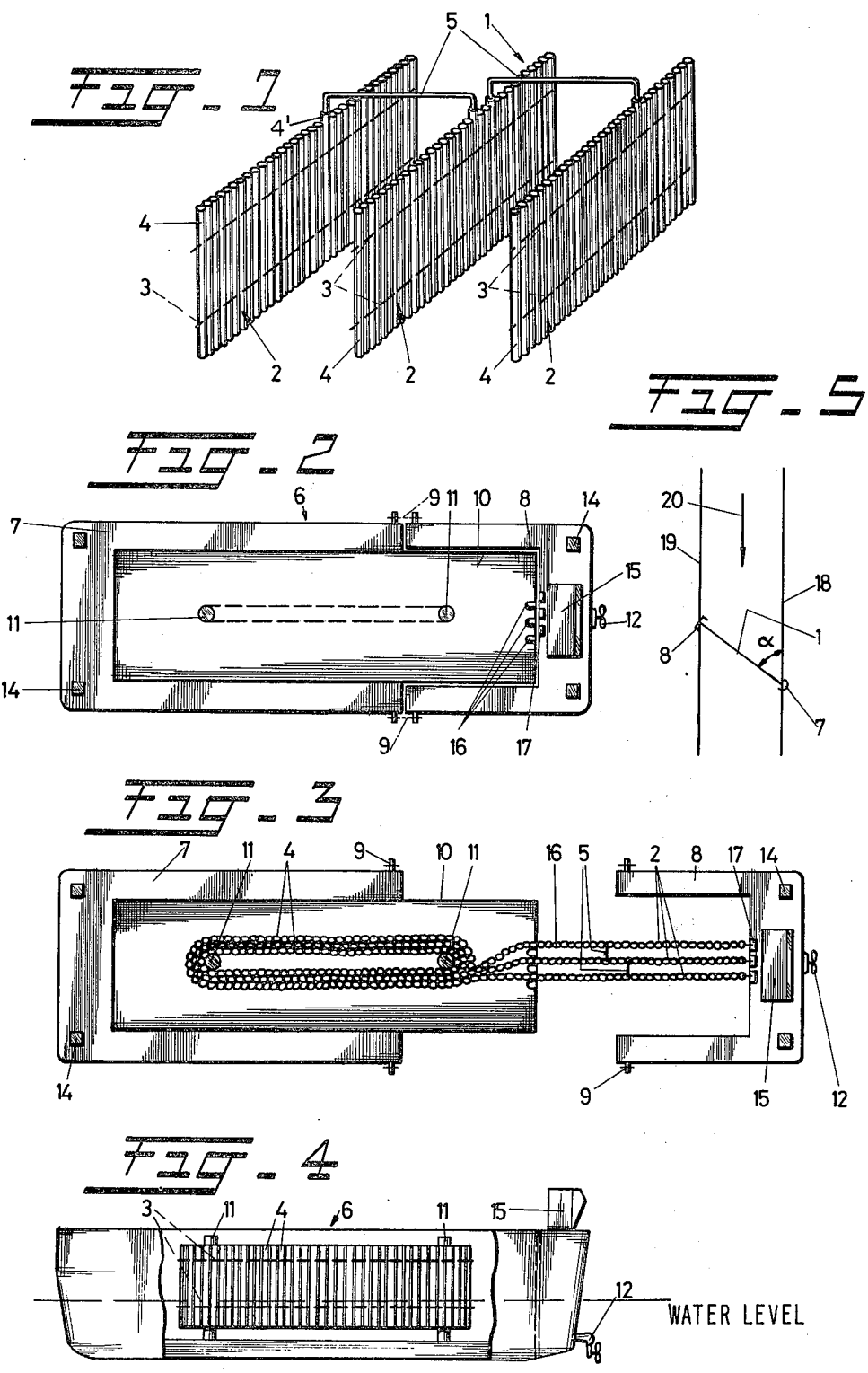

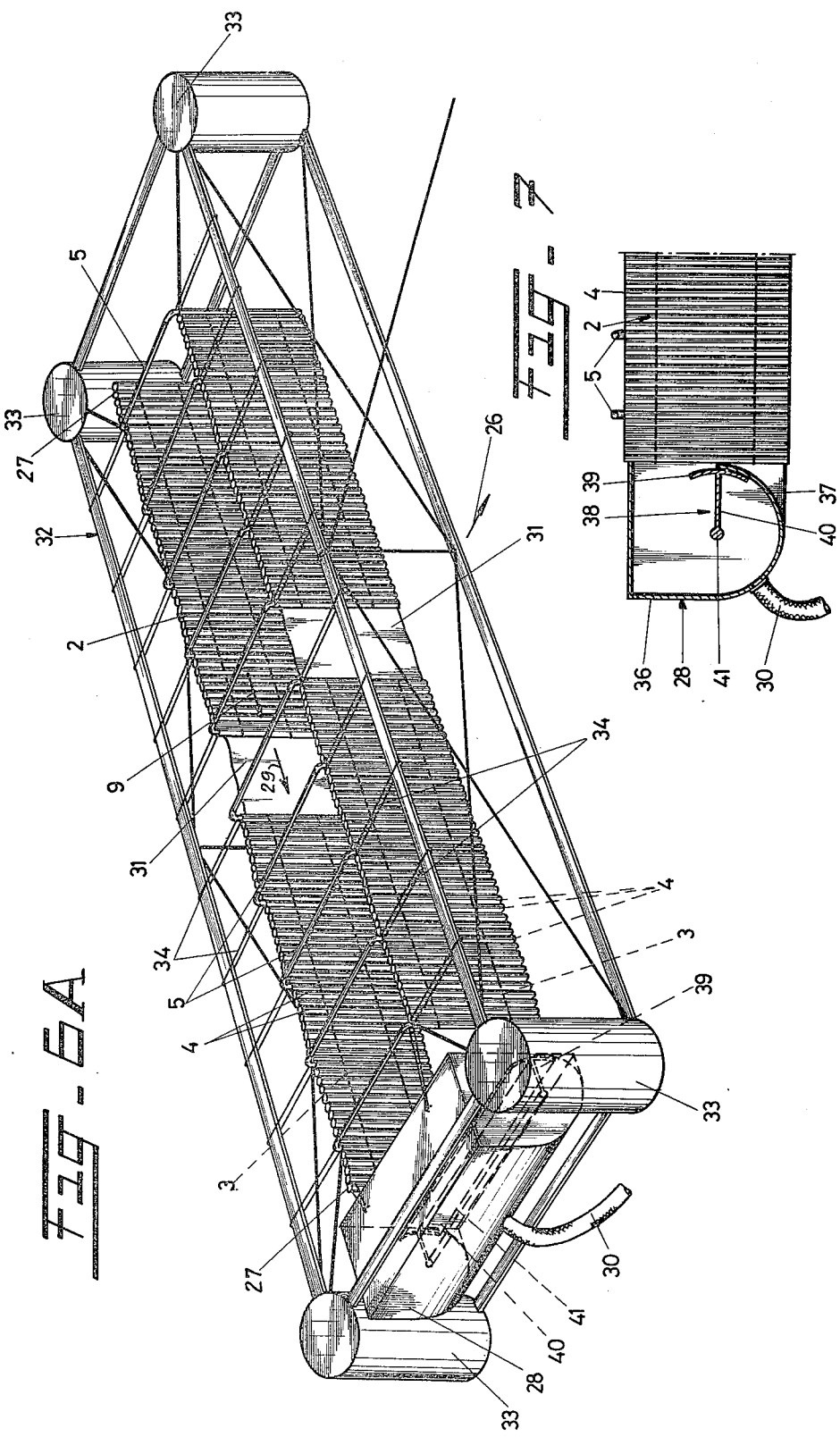

OIL BOOM AND METHOD OF SKIMMING FLOATING OIL FROM THE SURFACE OF A BODY OF WATER

This is a continuation of application Ser. No. 422,603, filed Dec. 6, 1973, now abandoned.

The invention relates to an oil boom for skimming a lighter liquid, such as oil, from the surface of a body of water. The oil boom comprises at least a pair of surface barrier screen members with means for maintaining the members in substantially parallel relationship. The barrier members are constructed in a particular manner from multiple, vertical elements flexibly interconnected in contiguous relationship and the area between the barriers forms an open channel through which liquid may flow. A liquid diverter means at one end of the oil boom diverts liquid into the channel to induce a surface transport current therein flowing towards the opposite end of the oil boom, where a skimmer is provided for removing liquid from the surface of the body of water. The barriers are of progressively longer lengths from a forward to an aft barrier to enable flow of surface liquid around the ends of the shorter barriers into the channel areas between the barriers.

One aspect of the invention relates to an oil boom construction, that is to say a boom which when oil has been discharged in the water, is spread out around the oil patch in order to localize it. Such an oil boom may be used effectively inter alia in ships, particularly tankers, in order, in case of leakage of oil from the ship, to keep the discharged oil alongside the ship. An oil boom is also employed in ports, rivers and other locations where the water is subject to currents in order to prevent a possible oil patch from floating downstream of upstream. In such a case the oil boom is spread out transversely to the direction of the current. The prior art oil boom consists of a strip of fabric or plastic which at intervals is provided with means which serve to maintain the strip spread out in the direction of its width. In operation the strip adjusts itself with its smaller dimension in the vertical plane and is held floating in the water in this position by the cooperation of the said means with floats. These floats should moreover be so dimensioned that in operation the boom does not cant from the vertical position.

Such canting may occur both in launching the oil boom and in operation. In the latter case the boom is exposed to such a strong current or rate of flow that a negative stability of the boom is produced. When the boom has canted it serves no further purpose. The prior art boom further has the disadvantage that when it is in the required operative position, upon the occurrence of a certain rate of flow of the water, oil passes below the boom. Moreover, the difficulty arrises that locations where the boom is to be launched or retrieved are hardly suitable for these operations, particularly due to complicated construction of the prior art boom with its floats.

The object of the invention is to provide an oil boom of the kind referred to wherein the said disadvantages are eliminated.

According to the invention this object is achieved in that the boom is characterized by at least two spaced-apart partial booms or oil barrier screens extending parallel to each another, each screen comprising a series of adjoining parallel vertical members strung together by means of at least one cable, said vertical members being of substantially the same length and being of a material capable of floating in water, and a plurality of bracing members for maintaining the screens in spaced apart, parallel relationship, and in vertical position.

The oil boom according to the invention has the advantage that no separate floats are necessary to keep the screens afloat. The tendency of the boom to cant is countered in that the boom, so to speak, stands on two legs. At the locations of the spacers, the bracing members, sometimes referred to as oil boom, according to the invention, has an effect: cross-section in the form of an inverted U of wherein the dependent limbs extend into the water while the base lies above the water. A great advantage is to be seen in that the boom requires less draught when operating in running water. When a layer of oil floating on the water, driven along by current or wind, strikes the first or front screen with a great velocity of, for instance, two knots, again just as in the prior art oil boom, some oil will pass below the first partial boom. However, this underpassing oil, due to vertical current actions, rapidly reappears at the water surface. The second or rearward screen then prevents this amount of oil which has underpassed the first screen from floating away further. The conditions such as the thickness of the oil layer and the strength of the current must indeed be extremely unfavourable for the layer of oil adjacent the second screen to assume such proportions that here too, oil will pass below the second screen. When such unfavourable conditions are expected, a third, and possibly a fourth screen can be employed. The small draught of the oil boom results in a lesser rate of flow of the water along the bottom of the boom and consequently diminishes the possibility of oil particles having less buoyancy being entrained with the underpassing water. It should be noted that particularly because the oil boom according to the invention is less sensitive to currents in the water than the prior art oil booms, the boom according to the invention is well adapted to displace an oil patch on the water surface.

The manufacturing cost of an oil boom according to the invention, due to its more simple construction, is less than that of the prior art oil boom.

In the oil boom according to the invention connecting cables extend through suitable transverse openings provided in each vertical member. Preferably each vertical member is in the form of a hollow tube of a material which is less dense than water, and is of a circular cross-section. Preferably, the tube is filled with a foam plastic which is impermeable to water.

The spacer members are preferably each in the form of a rigid, U-shaped element arranged with its limb ends to be telescoped into two spaced vertical members of the screens, the vertical members being directly opposed to each other.

In order, when attaching the horizontal spacers, to mark a location of attachment the vertical members into which a spacer can be received are divided with a projection at the mounting side thereof extending beyond the upper ends of the vertical members.

Although the connecting cable may be of any suitable material, it is preferably made of nylon.

In order to as much as possible avoid the risk of fire, the oil boom according to the invention is preferably made of a non-combustible material or a material which has been made non-combustible by applying a coating of suitable material.

However, for reasons of saving manufacturing costs, only one screen of non-combustible material will suffice, namely the screen which in operation arrests the layer of oil in the first instance.

After use the oil boom according to the invention can be stored just as the prior art boom. A device for storing the oil boom according to the invention is characterized by a container consisting of two parts which are connectable to each other and each having a buoyancy of its own. By this measure the advantage has been obtained that, in contrast to the prior art boom, the oil boom according to the invention does not need to be cleaned. The oil and other sludge dripping down from the boom does not end up in the environment but in the container, where the oil does not detract from the aesthetical appearance of the depot and does not contribute to further water pollution. The floating container may be readily towed to a different location. A container also may be hoisted aboard a ship in a simple manner like a life-boat.

In a prefered embodiment according to the invention, one part of the container is provided with a winding device for the oil boom while the other part is equipped with a propelling device for the container. Thus, in the first place, the container can move under its own power. Besides, the possibility is thereby obtained that the oil boom without outside assistance (the system is "self-supporting"). In the event of the oil boom, for instance, having to be spread out in a river in a direction perpendicular to the direction of the current, the container travels to a river bank where it is moored in such a manner that the end of the container equipped with the propeller is oriented towards the centre of the river. The free end of the oil boom is attached to the container part equipped with the propeller and this container part, after disconnecting the two parts of the container, is caused to travel in the direction of the other bank by means of the propeller, the oil boom being unwound from the winding device and being paid out until the other bank has been reached where the container part which has been ferried across is secured.

In order to insure smooth launching of the boom, the winding device is equipped with two winding reels positioned parallel to each another and perpendicular to the bottom of the container. In the preferred embodiment of the container, the part thereof which carries the winding device is provided at the side facing the other part of the container with guide means for guiding the screen units at the required mutual, spaced apart distance upon unwinding the boom. By this measure the screens, when the boom is being paid out, leave the container at the required mutual distance and the horizontal spacers can be attached at the appropriate locations without difficulty.

The container part equipped with the propeller is preferably provided with a device for stringing together the vertical members of the partial booms. In the event of clearance having developed between the bars during winding and unwinding as a result of elongation in the cable the latter should be tightened by the said device.

According to a further characteristic of the invention, at least one of the two container parts is provided with an oil suction system. By this measure, the advantage is obtained that the oil boom according to the invention, besides retaining or localizing an oil patch particularly on rivers and canals and/or waterways in which liquid flow occurs, takes an active part in removing the oil. In the case described above wherein one end of the boom is secured to a river bank and the other end of the boom, the so-called free boom end, is paid out, such paying out may for instance partly take place against the current in such a manner that between the spread out boom and the river bank from which the paying out has started an angle of approximately 70° is enclosed. The oil which comes drifting down with the current will move along the boom in the direction of the point where the boom is secured to the bank. If the exhaust means for exhausting the oil is at that location the boom effectively takes part in removing the oil patch.

According to another characteristic of the invention the container for storing the oil boom has a draught which exceeds the draught of the boom in operation in the water.

Under certain conditions, particularly in open water, where widely divergent weather may prevail, it is often desirable not only to localize the oil patch but more particularly to stow it while simultaneously removing the oil patch and thus, to express it in a simple manner, to skim the oil patch.

According to the invention the oil boom is suitable for this purpose in that each screen has a length which exceeds that of the screen directly in advance thereof and at both ends projects almost an equal distance beyond the ends of the adjoining screen in front of it, the oil boom being provided at one end with an exhaust means extending perpendicularly to the longitudinal direction of the boom (transversely) and across at least the entire width of the oil boom assembly abutting against the end of the longest screen. Each screen is being provided with at least one flexible hinge joint such that the screen is divided into sections of substantially equal length. The entire oil boom is preferably surrounded at some distance by a rigid frame which is held above the water surface by its own floats and is connected with the outer screen by means of flexible connecting members.

In the event of the oil boom according to the invention being towed in the direction of its width over or through an oil patch, the surprising result can be observed that the screening effect referred to above is combined with water-oil mixture flowing through the space between the screen from the free end of the oil boom toward its end which is provided with the exhaust member. In the oil boom itself liquid flow sets, herein referred to also as a surface transport current, which is approximately perpendicular to the direction of movement of the oil boom (parallel to the screens). The amount of liquid mixture which, in the direction of movement of the oil boom, is in front of the formost screen is free to move in a direction transversely of the direction of movement of the oil boom at the two ends of the formost screen and in doing so is collected by those sections of the screen rearward of the formost screen which project beyond the latter and arrives in the grip of the above-mentioned transport current flow perpendicular to the direction of movement of the oil boom which occurs between two screens of the oil boom towards the exhaust member. In operation this exhaust means is connected to a reservoir for containing exhausted oil-water mixture.

The said exhaust means has its own buoyancy and therefore has no detrimental influence on the stable vertical position of the oil boom.

According to a characteristic of the invention the exhaust means is essentially a floating weir having a cross-section in the shape of a trough, of which the rear wall remote from the oil boom being higher than the front wall and the front wall is provided with a non-return valve arrangement.

The buoyancy of the exhaust means is adjusted so that in operation the edge of the lower trough wall lies slightly below the water surface.

Thus it is achieved that of the liquid fed to the exhaust means by the above-mentioned transverse transport flow between the screens only a thin surface layer which in essence contains the oil has access to the exhaust means.

In order to prevent the liquid, once it has entered the exhaust member, from being thrown back outwardly by the always existing movement in the water surface, the front wall of the weir includes a moveable, float adjustable inlet gate or lip which is displaceable in a vertical direction for adjusting the effective height of the front wall of the weir.

According to a preferred embodiment of the invention the inlet lip is carried by an arm assembly which at the other end is hingedly supported on a shaft extending in the longitudinal direction of the trough substantially at the level of the edge of the lower trough wall.

In open water account will be taken of swell which subjects an oil boom, and in particular an oil boom of some length, to forces which involve loads for the structure, in particular the longitudinal structure of the oil boom. The above mentioned flexible hinge joint serves to reduce this load. The two portions of a screen adjacent to the hinge joint can move with respect to each another in each direction. Therefore the oil boom is suitable for the object pursued.

Preferably, a hinge joint consists of a means of yielding material provided between two adjoining vertical members.

According to a preferential embodiment of the invention the yielding material is a strip of plastic.

For the above-mentioned object pursued, the oil boom is towed in a direction approximately perpendicular to its longitudinal direction and in doing so it should be arranged for the operative position of the boom to be affected as little as possible by the towing operation. This can be achieved by using various expedients which guarantee that the oil boom maintains its longitudinal extension and vertical position.

According to the invention this preferably occurs by the rigid frame already mentioned above, which surrounds the entire oil boom in spaced relationship and is held above the water surface by floats of its own and is connected to the outer screens by means of flexible connecting members.

The thus embodied frame under wave conditions in fact contributes to maintaining the oil boom as well as possible at the required draught.

According to another characteristic of the invention the floats at the end of the frame surrounding the oil boom and remote from the exhaust means are in the form of a single pontoon having its own buoyancy and being provided with a conduit extending therethrough and opening into the space between the partial booms, said pontoon being hingedly connected to the rigid frame by a hinged coupling adapted to be fixed in a desired position by means of a locking member.

By employing a pivotable pontoon as described above at the remote end of the boom, a kind of rudder action is obtained which is adjustable and contributes to a correct extension of the boom with regard to the direction of movement during the progress of the boom. This contribution is particularly noticeable when in a towing operation the boom extends outwardly on one side of the towboat.

The invention will now be further explained with reference to the drawings in which:

FIG. 1 shows a diametrical perspective view of the oil boom screen unit constructed according to the invention;

FIG. 2 shows a plan view of a device for storing and transporting the oil boom according to FIG. 1;

FIG. 3 shows a plan view of the device according to FIG. 2 after paying out the oil boom screen has been started;

FIG. 4 shows a longitudinal section of the device according to FIG. 2 with stored oil boom screen;

FIG. 5 shows a manner of operating the oil boom according to the invention;

FIG. 6A shows a perspective view of the oil boom according to the invention;

FIG. 7 shows a cross-section of the exhaust means; and

Figure 8:
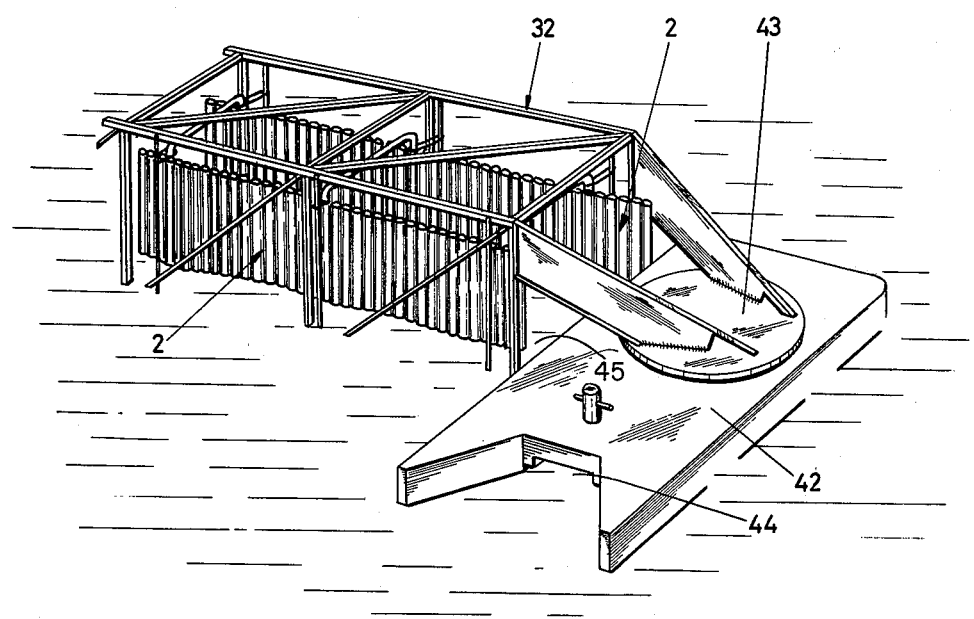
FIG. 8 is a perspective view of the boom assembly with an outboard pontoon in position.

As appears from FIG. 1 the oil boom 1 according to the invention consists of three parallel screen sections which are of the same construction. Obviously, the number of screen (variously referred to as partial booms) 2 may be chosen according to the circumstances.

Each screen 2 is built up of a large number of parallel vertical members 4 wshich are strung together by means of at least one strand 3. In operation the members 4 in fact adjoin one another so that they form a screen for an oil patch floating on the water surface. The members 4 are in the form of hollow tubes or pipes of circular section of a material which floats in water, preferably plastic. According to one embodiment, the bars 4 are filled with foam plastic which is non-permeable to water. The strand 3 by which the members 4 are strung together and of which the number may be chosen according to the circumstances extend through a transverse bore made in each bar extending perpendicularly to its axis. In FIG. 1 each screen 2 is provided with three strands. Although these strands may be of any suitable material may preferably comprise nylon rope or cable.

Each two adjacent screen 2 are held in spaced parallel relationship by horizontal spacers 5 the number of which may be chosen according to the circumstances. Each spacer 5 is preferably made in the form of an inverted U-shaped brace. The material of the spacers has been chosen with a view to the buoyancy of the oil boom according to the invention. The legs of each are spacer 5 telescoped into a vertical member 4 of a screens 2 which are opposite to each other in the direction perpendicular to the direction in which the oil boom extends. In order to assist in this telescoping, and for locating the positions of the members to receive the legs, the members 4' have a greater upper length than the other bars.

The oil boom according to the invention has a buoyancy of its own. In operation the screens 2 float in the water in a vertical position as shown, which vertical position is maintained by the employed spacers 5. The vertical members 4 which have a length of approximately 40 cm have approximately half their length below the water surface. Due to the members being tightly strung together, in the event of a current in the water which is perpendicular to the direction into which the oil boom extends, the oil floating on the water cannot pass through the screen between the members. In the event of a strong current in the water, that a small quantity of oil which lies against the outer or most forward screen may be entrained with the water flow passing beneath the bottom of the forward screen into the space between the latter and the central screen. This amount of oil in the said space rises to the water surface and is displaced against the forward face of the screen. Extremely strong oncoming currents in the water will have to set in to cause oil to underpass the central screen, but the third screen will catch such underpassing also. The oil boom according to the invention thus effects a complete blocking of oil flow. The number of screens may be chosen in accordance with the circumstances (weather conditions, current). In this connection the small draught of the oil boom according to the invention is pointed out which results in the flow of water below the boom due to current in the water being less than other booms, and therefore the chance that oil is entrained in the underpassing water is smaller than with a boom having a greater draught. To this advantage is added the advantage that the amount of oil which has possibly underpassed the first screen is arrested by the second or third etc. screens.

Due to the oil boom according to the invention not having separate drive means, storing and spreading out the oil boom has been made considerably easier.

When storing the oil boom, the spacers 5 are removed while the screen come into abutting relationship and the boom may be wound on a reel like a conventional oil boom.

As appears from FIG. 2, however, the device for storing the oil boom according to the invention consists of a container 6 constructed of two adjoinable parts 7 and 8 which each have their own buoyancy. Joining the said parts can take place in each suitable manner at 9. In FIG. 3 the parts 7 and 8 are disconnected and spaced from each other. The container part 7 carries the winding device which preferably consists of two spaced parallel winding reels which are perpendicularly mounted on the bottom 10 of the container. The container part 8 is provided with a propelling device with a propeller 12. Both parts 7 and 8 of the container are provided with at least one anchor windlass 14. A reel house is indicated with the reference numeral 15.

The device proposed by the invention for storing the oil boom which consists of a container 6 can therefore move in the water itself by using the propeller 12. The device moreover has the great advantage that the oil boom, after having been used, does not need to be cleaned. The defilements of the boom, mostly consisting of oil and sludge, may safely drain into the container 6 which can be cleaned when necessary, which is considerably more simple than cleaning the oil boom while being wound.

The device proposed by the invention for storing the oil boom further has the advantage that the device itself may be used for spreading out the oil boom. In the event of the oil boom for instance having to be spread out across a river it is possible by using the propelling device to navigate the container 6 to a point of a river bank from where the boom is to be spread out. It can be arranged that the container 6 is moored at that point in such a manner that the part 7 lies alongside the river bank and the longitudinal axis of the container is perpendicular to the direction of the river. For mooring the part 7 in such a manner tne anchor windlasses 14 may be used. After mooring the part 7 the part 8 is disconnected and navigated in the direction of the other river bank by means of the propelling device. The part 8 has secured to it the free ends of the screens 2 of the oil boom according to the invention. Upon navigating the part 8 away the oil boom 1 is therefore at the same time paid out until the other river bank is reached where the part 8 is secured to this bank possibly by means of the anchor windlasses 14 and mooring ropes. In order when the boom is being paid out to get the screens 2 at the required distance from each other the container part 8 is provided with guide members 16 which are at a distance from each other which corresponds with the required distance between the screens 2. While the oil boom is being paid out the horizontal spacers 5 are telescoped onto the upper ends 4' of vertical members 2 at the guide members 16. For correctly paying out the oil boom it is necessary that the winding device is provided with a brake device. The container part 8 has the screens 2 preferably secured to it through a stringing device 17 preferably in the form of a small capstan by means of which the strands 3 after paying out the oil boom are tightened when necessary in order that the vertical members 4 come into correct abutting relationship. After the operation the boom may be again stored by disconnecting the container part 8 from the river bank and activating the winding device in the part 7.

From the above it will be clear that the device for storing the oil boom according to the invention is so to speak self-supporting and can perform all operations without outside assistance. Furthermore there is the advantage that the device may be readily hoisted aboard a ship and launched like a life-boat.

The oil boom according to the invention produces an effective blockage of oil floating on the water in flowing water, while for this boom a simple storing system is possible which has no cleaning problem. By the device according to the invention for storing the oil boom the oil boom can be readily spread out while the oil boom furthermore can rapidly be at the intended location without using towboats and the like. The boom may have any required length and may be readily taken aboard a tanker, while for operating the boom only little manpower is required.

A particularly functional application of the oil boom according to the invention is indicated in FIG. 5 in which the reference numerals 18 and 19 indicate the banks of for instance the river in which there is a current running in the direction of the arrow provided with the reference numeral 20. In the event of an oil patch floating down this river the boom 1 can be spread out in the condition shown in FIG. 5. The small angle enclosed between the boom 1 and the bank 18 will be appproximately 70°. The oil floating down the river, when it contacts the boom 1, will move along the boom in the direction of the container part 7. This container part is provided with an exhaust means or exhaust weir (not shown) where the oil is drawn from the water. In this manner the oil boom has taken an active role in removing the oil. The said exhaust trough can be of any desirable embodiment which is connected to an oil storage facility.

It needs no argument that contrary to the situation according to FIG. 5, the container part 7 may be situated upstream with regard to the container part 8. In this case the container part 8 should be provided with an oil exhaust means or oil exhaust trough.

Figure 6B:
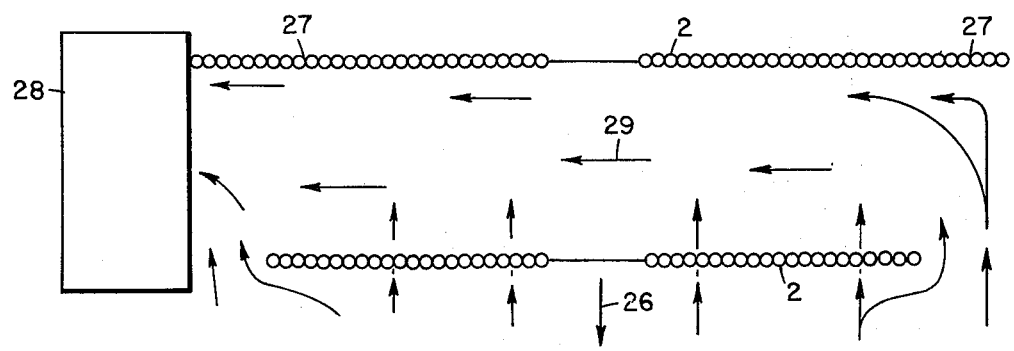
FIG. 6B shows a schematic plan view of the device according to FIG. 6A in operation.
Figure 6C:
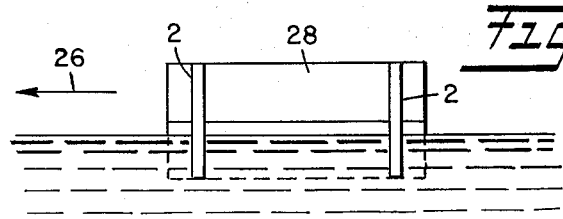
FIG. 6C shows an end view of FIG. 6B.

It will be understood that in the scope of the invention modifications are possible. In the embodiment of the oil boom indicated in FIG. 6A–C; the boom consists of only two screens 2.

The arrow 26 indicates the direction in which this oil boom is towed, the boom more in particular serving as oil skimmer. Upon the appearance of an oil patch in open water it is of course useful to localize the oil patch but it is of greater importance to remove it.

According to the invention one screen; 2 (the aft screen) has a length exceeding that of the other (the forward) screen. The aft screen 2 at both ends projects with practically equal lengths 27 beyond the forward screen 2.

At one end the oil boom is provided with exhaust means 28 which extends perpendicular to the longitudinal direction and along at least the entire width of the oil boom to thereby form a surface barrier across the end of the oil boom. The exhaust means 28 lies against the end of the partial boom 2, that is to say the partial boom having the greatest length.

In the event of the oil boom in operation being towed as an oil skim to the oil patch in the direction of the arrow 26, a flow in the direction of the arrow 29 towards the exhaust means 28 sets in within the space between the two partial booms. Actually, the flow 29 is improved by inclining the boom slightly with respect to the vector of tow direction 26 so that the boom meets the oncoming surface oil-water mixture at a slight angle, with the end of the boom at which the exhaust means 28 is located trailing the opposite end of the boom.

When the oil boom is being towed an accumulation of oil in front of the formost screen 2 rapidly develops. Such accumulated oil looks for a way of escape which will partly run below the formost screen 2 into the space between the two screens 2 but also at both ends of the formost screen 2 around the ends. The oil-water mixture which follows this way of escape is intersected by the two extensions 27 of the rear screen 2 and incorporated in the flow term a transport current, which travels in the direction of the arrow 29 and in which also an amount of oil is incorporated which has followed the firstmentioned way of escape, viz. below the front screen 2. The exhaust means 28 now removes the surface oil-water mixture supplied by the transport current flowing in the direction of the arrow 29 and discharges same through a suction pipe 30 connected to a device for the further discharge or processing of the sucked up oil-water mixture.

The reference numeral 31 (FIG. 6A) designates a flexible hinge joint with which both screens 2 are equipped such that each screen is divided in sections of approximately equal length. Because in each screen of the embodiment indicated in FIG. 6A only one hinge joint is used, this joint is situated approximately in the centre of each screen. The number of hinge joints can obviously be chosen according to the circumstances. By said flexible hinge joint 31 the longitudinal structure of the oil boom is locally interrupted and the effect is obtained that the longitudinal structure of the boom is somewhat more adapted to the weather condition encountered in open sea, in particular to the conditions of the water surface which is always in motion due to wash of the waves, swell, etc. By this arrangement the oil boom maintains the draught for which it is dimensioned. The screens are thus enabled to ride on the water surface in vertical condition with a minimum of stresses being reacted to the screens or the boom framework.

A hinge joint preferably consists of a strip of flexible material provided between two adjacent vertical members 4. The longitudinal axis of the strip is parallel to the longitudinal axis of the vertical members and the length is approximately the same as that of the members 4. As the flexible material, preferably plastic is chosen. By this hinge joint the two sections joined by this hinge joint can always move in all directions with regard to each other without the function of the screens being adversely affected.

As illustrated in FIG. 6A, the entire oil boom is further surrounded in spaced relationship by a rigid frame 32 which is held above the water surface by its own floats 33 and is connected to the screens 2 by means of flexible connecting members 34. Each flexible connecting member 34 which at one end is secured to said frame 32 is preferably secured at the other end to a spacer 5. Preferably a cable is used as a connecting member 34.

The floats 33 of which the number is chosen according to the circumstances may be of any suitable embodiment and may be directly be connected or not to the oil boom.

The frame 32 itself is preferably constructed in the form of a rectangle of metal profiles, the sides of the rectangle having a greater length than the adjacent length- and width dimensions of the oil or skim boom.

This frame 32 surprisingly also contributes to maintaining the required draught of the boom in rough sea with waves or swell.

The oil boom is suspended in the frame in such a manner that both sections can vary in height with regard to each other. Both the frame and the oil boom within certain limits individually react to waving water. This behaviour contributes to the action of the oil skim being more efficient, that is to say under adverse weather conditions, with wash of the waves, an oil boom provided with said frame can be operated with a better result and the operation can be continued for a longer period of time than with an oil boom which is not provided with a frame.

Particularly with a view to the water surface during operations at sea normally being in motion the exhaust means 28 is preferably so arranged that the oil-water mixture supplied thereto can enter it but discharge thereof in returning direction is impeded.

The exhaust means 28 is made of a material which imparts thereto a buoyancy of its own. The attachment of said means to the oil boom is therefore only such as to cause this means to assume a position which is substantially perpendicular to the longitudinal direction of the oil boom, the exhaust means lying against one end of the longest (and most rearward) partial boom. As appears from FIG. 7 the exhaust means or weir has a cross-section in the form of a trough of which a wall 36 remote from the oil boom is higher than the trough wall 37 which is provided with a non-return valve 38. In practice the buoyancy of the exhaust means is so adjusted that the edge of the trough wall 37 lies slightly below the water surface. The non-return valve 38 has a position which projects above the edge of the lower trough wall 37 and is entirely influenced by the level of the liquid in the exhaust means. In the event of this liquid level by wash of the waves rising above that of the liquid adjacent to the exterior of the exhaust means, the non-return valve comes into action as regards preventing liquid to flow back outwardly from the trough-shaped exhaust means. If, to the contrary, the liquid level in the exhaust means descends below that of the exterior liquid, the non-return valve returns to its normal idle condition. The non-return valve thus in the operation of the oil skim is alternately in operation and idle.

According to a characteristic of the invention the non-return valve 38 consists of a an arcuate, buoyant inlet lip 39 abutting the inner side of the lower trough wall 37 and displaceable in a vertical direction.

According to a preferential embodiment the inlet lip 39 is carried by a solid web 40 which at the other end is hingedly supported on a shaft 41 extending in the longitudinal direction of the trough approximately at the level of the edge of the lower trough wall 37.

In operation, with some wash of the waves, the inlet lip 39 continuously moves up and down. This up and down movement is brought about by differences in level taking place in the exhaust means in cooperation with the buoyancy of the inlet lip 39.

In order to cause the oil boom according to the invention to function as an oil skim the boom is towed in a direction which is at an angle of approximately 90° to its longitudinal direction. The towing means serving for this end, that is to say the single or several towing lines, may be attached to a long side of the frame. The points of attachment of these towing lines are spaced along the length of the frame.

When towing the boom over the area to be treated it is advantageous when the boom only extends at one side of the tow boat, the end of the boom provided with the exhaust means 28 is placed adjacent to the vessel. In that case in fact an extremely favourable opportunity is created to carry off the skimmed oil either by storage in the towing vessel or in a storage vessel also towed by the tow boat.

This manner of towing implies that the other end of the oil boom, the so-called free boom end, needs a kind of rudder action, in particular an adjustable rudder action to maintain the oil boom in the required extension with regard to the towing vessel. This is obtained by replacing the floats 33 at this free boom end by a pontoon 42, which is hingedly connected to the rigid frame 32 by means of a hinge device 43. This pontoon 42, which has its own buoyancy, is provided with a conduit 44 which opens into the space between the two partial booms 2.

It need not be elaborated that the pontoon and also the hinged connection between the pontoon 42 and the rigid frame 32 may have any suitable embodiment. The hinged connection, however, should be provided with a locking device by which the angular position of the pontoon 42 with regard to the rigid frame 32 can be maintained.

It will be apparent from FIG. 8 that the longer screen 2 is disposed rearward of the shorter screen 2 with respect to the direction in which the screens are towed, and the pontoon 42 is disposed next to the adjacent end of the rearward screen 2, while a space 45 is left between the adjacent end of the forwardmost screen 2 and the pontoon 42. When the boom is towed in the manner described above, a surface transport current flow 29 is induced by the diversion of oncoming flow of surface liquid mixture passing through conduit 44 and into the channel space between the screens 2 in the direction running towards the skimmer 28 (see FIG. 6), and also by the surface flow of mixture driven between the pontoon 42 and the adjacent end of forward screen 2 due to the relative motion between the boom and the surface of the body of water.

I claim:

1. An oil boom for collecting lighter liquid floating on a body of water, the boom comprising at least two rows of multiple, contiguous, elongate, buoyant, vertical members; flexible means securing said vertical members together in generally parallel relationship; a plurality of rigid bracing members; each row of vertical members being retained in spaced-apart, parallel relationship from an adjacent row by the bracing members, the bracing members bridging adjacent rows and being secured to the vertical members by means enabling the latter to be supported vertically by said bracing members; the upper and lower ends of the vertical members extending above and below the surface of a body of water when the boom is afloat.

2. The oil boom recited in claim 1, further including an elongated rigid frame; float means attached to the frame; and flexible connector means extending between and secured to the frame and the rows of vertical members for maintaining each row of vertical members in substantially linear relationship along the length of the frame.

3. The oil boom recited in claim 2, wherein the areas between said rows comprise open channels for the flow of liquid therebetween and said rows are of progressively increasing lengths arranged to cause liquid flow past the end portions of a first row with diversion of such flow by its adjacent spaced-apart row of greater length into the channel between the rows.

4. The oil boom recited in claim 3, further including floating diverter means connected to the frame adjacent the ends of said rows at one end of the oil boom.

5. The oil boom recited in claim 4, including a skimmer means for removing surface liquid located towards the opposite end of the oil boom from said diverter means and disposed for removing liquid within the channel areas between said parallel rows.

6. The oil boom recited in claim 5, further wherein at least one of the said float means is elongated and secured to the frame at the end of the oil boom opposite the skimmer means by an adjustable hinge means, said one float means extending generally fore and aft across the vertical planes including the rows of vertical members and being pivotally adjustable about a vertical axis, whereby, when the frame is towed across the surface of a body of water in a direction normal to the longitudinal axis of the rows with the frame pivotally secured at the skimmer end to a towing vessel, the float means can be adjusted to perform a rudder function for stabilizing and orienting the oil boom.

7. The oil boom recited in claim 6, wherein said floating diverter means comprises a conduit in said one float means, said conduit providing communication between a forward facing end of said float means and the channels defined between said parallel rows, the conduit being positioned at least in part below the normal water line of said float means.

8. The oil boom recited in claim 7, further wherein said rows of vertical members are divided into segments separated by coplanar and coextensive flexible webs, whereby the ability of said rows of vertical members to follow wave action along their lengths is enhanced.

9. The oil boom recited in claim 8, wherein said skimmer means is a floating weir comprising a receptacle body having an inlet lip and an outlet opening, the inlet lip being connected to an imperforate web extending horizontally across a substantial portion of the interior of the receptacle body, and buoyant means associated with the inlet lip for regulating its floating depth, whereby said inlet lip and web form a one-way inlet valve for surface water and floating lighter liquid flowing over the inlet lip and into the receptacle body.

10. The oil boom recited in claim 9, further including a suction means attached to the outlet opening of the floating weir for evacuating the receptacle body of surface water and lighter liquid received therein.

11. An oil boom for collecting a lighter liquid floating on the surface of a body of water, comprising at least a pair of elongate, substantially parallel buoyant barrier members; support means connected to and extending between the barrier members for maintaining them in substantially parallel relationship; each of said parallel barriers defining therebetween a channel for the flow of liquid; diverter means for liquid disposed towards one end of the oil boom for diverting liquid into and along the channels; skimmer means for removing liquid from the surface of a body of water disposed at the opposite end of the oil boom and adjacent the channels; said barrier members being of progressively longer lengths to permit flow of liquid at least around a first end of the shorter barriers and into the channels adjacent the skimmer means; whereby lighter liquid floating on the surface of a body of water and carried to the oil boom by relative motion between the oil boom and the water surface in a direction transversely of a longitudinal axis of the barriers will be diverted to the said channels and towards the skimmer means by the diverter means, as well as by the barrier members.

12. The oil boom recited in claim 11, further including end closure means for each of the channels between the parallel barriers and disposed at the end of the oil boom adjacent the skimmer means, the said skimmer means being disposed between the closure means and the adjacent ends of each of the channels, the said first end of the shorter barriers being spaced from the end closure to permit liquid flow around said ends into each of said channels.

13. A method of collecting and removing lighter liquid floating on the surface of a body of water comprising:
 a. causing relative movement between a plurality of elongate, buoyant, spaced-apart barrier members supported rigidly to maintain the barrier members in parallel relationship and the surface of a body of water upon which the lighter liquid is afloat in a direction generally transverse to the longitudinal axes of the barrier members, the barrier members being of progressively longer lengths in a forward to aft sense and defining open channels between the barrier members for the flow of liquid, the progressively longer lengths of barrier members being arranged to enable flow of liquid past at least the first end portions of forward barrier members into the channels between the barrier members;
 b. removing liquid from the surface of the body of water at one end of the channels adjacent said first end portions of the forward barrier members; and
 c. diverting relatively moving liquid into the channels at their ends opposite to the skimmer means and in a direction towards the latter,
 d. whereby lighter liquid will be diverted into the channels between the barrier members by the forward barrier members around the first end portions thereof and lighter liquid underpassing the forward barrier members and rising to the surface of the body of water in the channels between the barrier members will be transported towards the skimmer means by the liquid diverted by the diverter means.

* * * * *